United States Patent Office 3,539,508
Patented Nov. 10, 1970

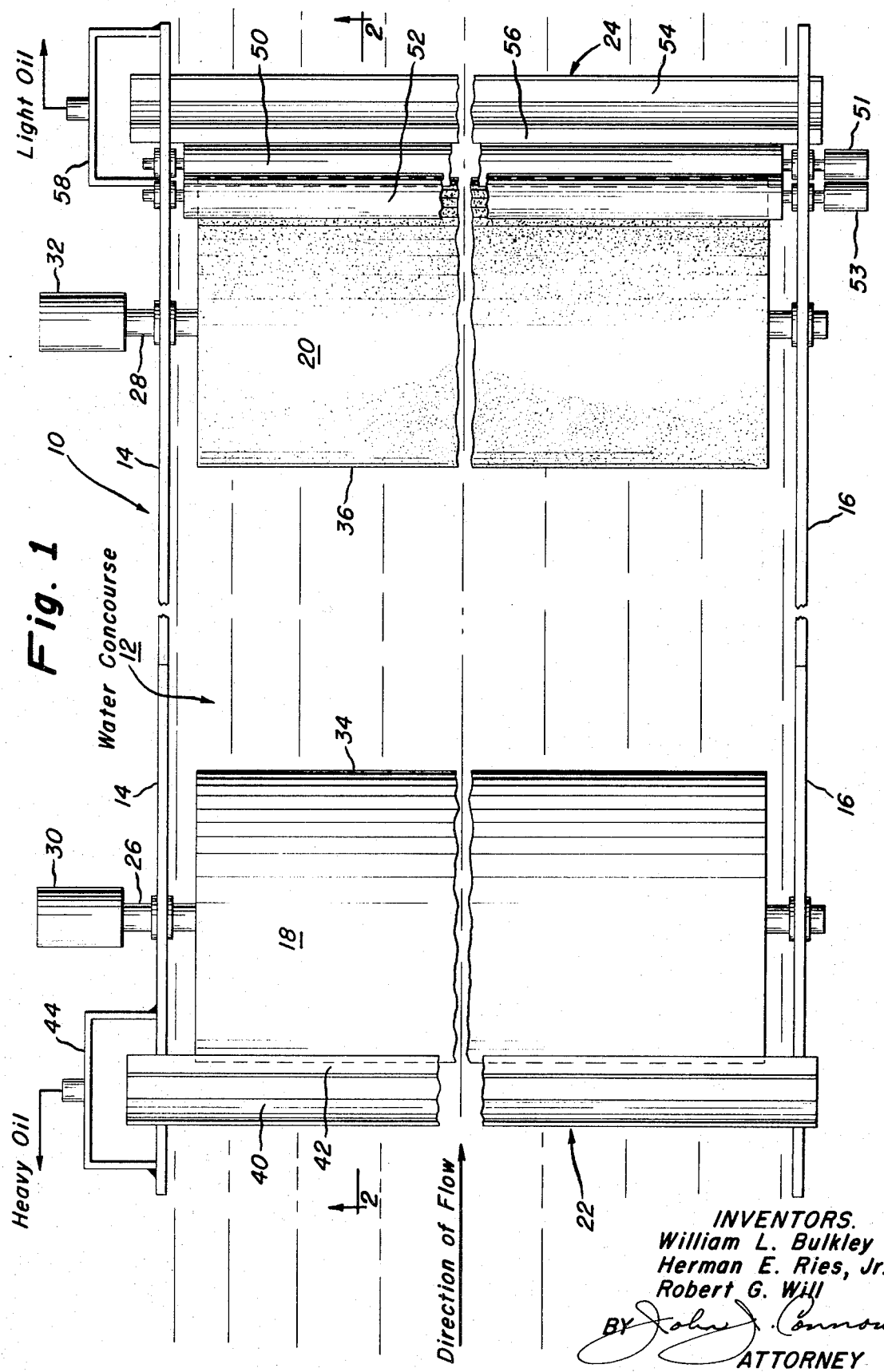

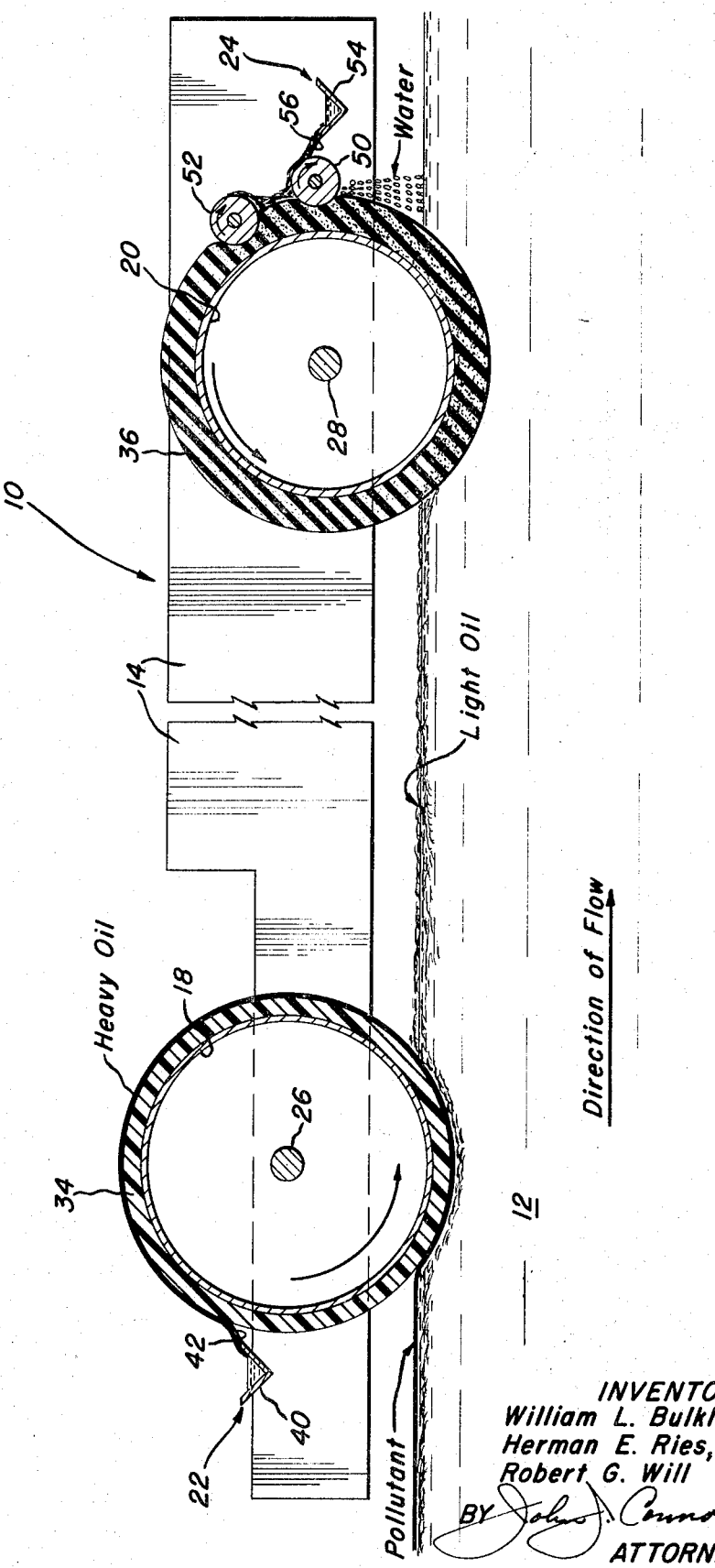

3,539,508
METHOD AND APPARATUS FOR SEPARATING OIL AND THE LIKE FROM A LIQUID
William L. Bulkley, Munster, Ind., Herman E. Ries, Jr., Chicago, Ill., and Robert G. Will, Munster, Ind., assignors to Standard Oil Company, Chicago, Ill., a corporation of Indiana
Filed Nov. 29, 1968, Ser. No. 780,084
Int. Cl. B01d 17/02
U.S. Cl. 210—40
13 Claims

ABSTRACT OF THE DISCLOSURE

This invention concerns a method and apparatus for removing floating material, particularly oily material, from a liquid. At least one pair of spaced, revolving pick-up members which dip into said liquid are used to recover the floating material. This material adheres to the members as they come into contact with the liquid, and means adjacent these members remove and collect the material adhering to them. The characterizing feature of this invention is that the surface of one member is smooth and oleophilic, and the surface of the other member is porous and deformable. The member having a smooth, oleophilic surface is in advance of the member having the porous, deformable surface, so that the smooth surfaced member contacts said floating material before said porous surfaced member.

BACKGROUND OF THE INVENTION

Oil contamination of water is a serious pollution problem. To combat this problem, various methods and devices have been proposed which physically separate the oil from water. U.S. Pat. No. 3,334,042 and U.S. Pat. No. 1,860,819 exemplify such methods and devices.

U.S. Pat. No. 3,334,042 teaches using a sponge-like member made of polyurethane foam to soak up a mixture of water and oil. The oil is removed from the foam by first gently squeezing the foam to remove only water, and then more vigorously squeezing the foam to remove oil. This method however has some limitations. The foam is a fragile material, and consequently, dirt and other particles entrained by the oil may cut or rupture the pore structure, reducing the life of the foam. Moreover, heavy oils, which are not readily removed from the foam, may build up in the pores, clogging them.

U.S. Pat. No. 1,860,819 teaches using a pair of oppositely rotating cylinders partially submerged in the contaminated water to collect oil. These cylinders have smooth, non-porous surfaces which attract oil. As the cylinders rotate, oil adheres to these surfaces, and a scraper in tangential contact with the cylinders' surfaces scrapes the oil therefrom. This method does a good job in recovering heavy oils, but it does not do a good job in recovering light oils.

BRIEF DESCRIPTION OF THE INVENTION

We have invented a method and apparatus for removing oily pollutants which float on the surface of water. Our invention, in combining the best features of the prior art, capitalizes on the ability of a smooth, oleophilic rotating surface to pick up heavy oils and the ability of the polyurethane foam to soak up light oils. Thus, we retain the advantages of the prior art while avoiding its limitations.

Our invention includes at least one pair of spaced, revolving pick-up members which dip into the contaminated water. As these members revolve, floating material adheres to their surfaces, and means adjacent the members remove and collect adhering material. The central feature of our invention is that one member has a smooth, oleophilic surface, and the other member has a porous, deformable surface. These members are so arranged that the smooth surfaced member comes into contact with the oil floating on the water before the porous surfaced member contacts said floating oil. Since heavy oil and entrained dirt adhere to the smooth, oleophilic surface, this heavy oil and dirt are removed before they have a chance to impair the oil recovery ability of the porous member. When the smooth surfaced member is rotated so that it tends to push floating material beneath the surface of the water as it contacts said material, quantitative removal of the heavy oil is insured. Thus, only light oil remains, which the porous surfaced member soaks up. If the porous surface is first gently squeezed by applying only sufficient pressure to remove water and then more vigorously squeezed by applying a sufficient pressure to remove the light oil, the porous surface is not only regenerated, but separation of the oil and water is achieved. The recovered light oil is thus delivered to suitable collecting means substantially free of water. Heavy, sticky oils generally have a viscosity greater than about 500 centipoise, and light oils generally have a viscosity less than about 500 centipoise.

Any porous material which is preferentially wet by oil can be used, but we prefer polyurethane foam. This material has been found to be particularly effective in recovering oil from the surface of water. Preferred smooth, oleophilic materials are polyethylene and steel, but again, other materials can be used so long as they attract oil and permit easy removal of attracted oil. We have found that polyethylene is more oleophilic than steel, and therefore, we prefer this material over steel.

The pick-up members may revolve at the same speed and in opposite directions, but we prefer to have the smooth surfaced member rotating at a greater speed than the porous surfaced member, and we also prefer to have the porous surfaced member rotate in the same direction as the smooth surfaced member, i.e., with the direction of flow of the water, so that the floating material is pushed beneath the water's surface as it contacts the porous member. If the porous member rotates opposite the smooth member, the efficiency of the porous member is somewhat impaired. Both the porous surfaced member and the smooth surfaced member are only partially submerged beneath the surface of the water, but the porous surfaced member desirably is submerged at a greater depth than the smooth surfaced member.

DESCRIPTION OF THE DRAWINGS

FIG. 1 is a plan view of the preferred embodiment of our invention.

FIG. 2 is a cross-sectional view taken along line 2—2 of FIG. 1.

DESCRIPTION OF THE PREFERRED EMBODIMENT

As shown in the figures, apparatus 10 of our invention traverses water concourse 12; however, apparatus 10 could just as easily be mounted to a boat. Apparatus 10 has the following major components: spaced supports 14 and 16; spaced, pick-up cylinders or drums 18 and 20 journaled for rotation between supports 14 and 16; and oil recovery means 22 and 24 mounted, respectively, adjacent drums 18 and 20. Coupled respectively to drive shafts 26 and 28 of drums 18 and 20 are drive motors 30 and 32. These motors turn drive shafts 26 and 28, and consequently drums 18 and 20, in a counter-clockwise direction as viewed in FIG. 2. Thus, drums 18 and 20 move in the same direction as the flow of water concourse 12. Motor 30, however, turns shaft 26 at a faster speed than motor 32 turns shaft 28. More quantitative removal of the heavy oil is attained when the drums are rotated in this manner at different speeds. Desirably drum 18 rotates at speeds ranging from about 40 to about 120 r.p.m., and drum 20 rotates at speeds up to about 20 r.p.m. We believe that the peripheral speed of drum 18 relative the speed of water concourse 12 is more important than the speed of drum 18 relative drum 20. We find that best removal of heavy oil is achieved if the peripheral speed of drum 18 is about twice that of water concourse 12.

In accordance with the principal feature of our invention, surface 34 of drum 18 is smooth and oleophilic, and surface 36 of drum 20 is porous and deformable. Surface 34 is made of polyethylene, and surface 36 is made of polyurethane foam. Drum 18 is in advance of drum 20 so that it contacts the oily pollutant floating on the surface of water concourse 12 before drum 20. This is crucial. As drum 18 dips into water concourse 12, heavy oil adheres to surface 34, and as surface 34 emerges from concourse 12, surface 34 brings the adhering oil into contact with recovery means 22.

Recovery means 22 includes pitched trough 40 having scraper edge 42 tangentially engaging surface 34. Edge 42, which is preferably covered with a highly slippery material such as Teflon or Viton, scrapes the heavy oil off surface 34, and the momentum of drum 18 carries the heavy oil into trough 40. The heavy oil then flows along trough 40 into receptacle 44 mounted to support 14, from which it is withdrawn by conventional means to a point of disposal or storage.

After removal of the heavy oil from water concourse 12, only the light oil remains. This light oil may be a distinct layer on the surface or may be dispersed throughout the upper strata of concourse 12. Consequently, drum 20 is submerged well below the surface of the water so that surface 36 sops up substantially all the dispersed light oil as well as surface oil. As drum 20 emerges from water concourse 12, surface 36 engages oil recovery means 24.

Recovery means 24 includes pitched trough 54, and wringer rollers 50 and 52, which are journaled for rotation between supports 14 and 16, and which are driven respectively by motors 51 and 53. Motors 51 and 53 turn rollers 50 and 52 counter to the direction of rotation of drum 20, and at peripheral speeds equal to the peripheral speed of drum 20. This prevents damaging surface 36. Roller 50 applies only sufficient pressure against surface 36 to remove water, whereas roller 52 applies a greater pressure which is sufficient to squeeze the light oil from surface 36. The light oil thus squeezed from surface 36 runs over roller 50; and edge 56 of trough 54, which is also preferably covered with Teflon or Viton, and which is in tangential contact with roller 50, directs this light oil into trough 54. This oil flows along this trough 54 into receptacle 58. Conventional means are used to withdraw oil from receptacle 58 and deliver it to a point of disposal or storage.

It is apparent from the above description that our invention provides a reliable and highly efficient method and apparatus for removing oily pollutants from water. Because heavy oil is recovered before it has a chance to damage surface 36, the life of this surface is extended far beyond what has heretofore been possible. Moreover, a clear-cut separation between the heavy and light oils is achieved, and a more complete recovery of light oil is obtained.

We claim:

1. The method of removing oil and the like which is floating on the surface of a body of water, comprising the sequential steps of:
    (a) contacting the body of water with a first rotating member having a smooth, oleophilic surface, said first member being rotated in a manner such that as it contacts the oil floating on the body of water it tends to push the oil beneath the surface of the water, whereby heavy oil adheres to said smooth, oleophilic surface and is separated from said body of water;
    (b) removing and collecting the heavy oil adhering to said smooth, oleophilic surface;
    (c) contacting the body of water with a second rotating member having a porous, deformable foamed plastic surface, whereby light oil and water are absorbed by said porous surface;
    (d) applying a first pressure to the porous, deformable surface sufficient to remove the water but not the light oil;
    (e) applying a second pressure to the porous, deformable surface sufficient to remove the light oil; and
    (f) collecting the light oil removed from the porous, deformable surface.

2. The method of claim 1 wherein said porous, deformable, foamed plastic surface is made of polyurethane.

3. The method of claim 1 wherein the smooth, oleophilic surface is made of steel.

4. The method of claim 1 wherein the smooth, oleophilic surface is made of polyethylene.

5. The method of claim 1 wherein the first and second rotating members rotated in the same direction.

6. Apparatus for removing oily material from the surface of a body of water, comprising:
    spaced mounting means at least partially above the body of water;
    first cylindrical means journaled for rotation between said mounting means, said first cylindrical means having a smooth, oleophilic surface which is partially submerged in the body of water;
    second cylindrical means spaced from said first cylindrical means and journaled for rotation between said mounting means, said second cylindrical means having a porous, deformable, foamed plastic surface which is partially submerged in the body of water;
    said first cylindrical means being in advance of the second cylindrical means so that said first cylindrical means contacts said oily material before said second cylindrical means;
    means for rotating said first cylindrical means in a manner such that as said first cylindrical means contacts the oily material it tends to push said oily material beneath the water's surface;
    means for rotating the second cylindrical means;
    means adjacent said first cylindrical means for removing and collecting materials adhering to said smooth, oleophilic surface after said oleophilic surface is withdrawn from the body of water;
    first compression means for applying a mild compressive force against said foamed plastic surface sufficient to remove at least some of the absorbed water from said foamed surface while allowing most of the oily material to remain absorbed in said foamed surface, said first compression means being positioned remotely from the body of water so that said force is applied to said foamed surface after said foamed surface is withdrawn from the body of water;
    second compression means for applying a severe compressive force to said portion of the foamed surface already having contacted said first compression means but prior to reimmersion in the body of water, said second compression means being located remotely from the body of water and applying sufficient compressive force to remove most of the absorbed oil material from the foamed surface; and
    means for collecting the oily material which is removed from said foamed surface by said second compression means.

7. The apparatus of claim 6 wherein said first and second compression means are rollers which are rotating counter to the direction of rotation of the second cylindrical means and at the same peripheral speed of said second cylindrical means.

8. The apparatus of claim 6 wherein said porous, deformable, foamed plastic surface is made of polyurethane foam.

9. The apparatus of claim 6 wherein said smooth, oleophilic surface is made of steel.

10. The apparatus of claim 6 wherein said smooth, oleophilic surface is made of polyethylene.

11. The apparatus of claim 6 wherein the second cylindrical means revolves in the same direction as the first cylindrical means.

12. The apparatus of claim 6 wherein the second cylindrical means is submerged at a greater depth beneath the water's surface than the first cylindrical means.

13. The apparatus of claim 6 wherein the first cylindrical means revolves at a greater speed than the second cylindrical means.

References Cited

UNITED STATES PATENTS

| | | | |
|---|---|---|---|
| 1,860,819 | 5/1932 | Schamberger | 210—523 |
| 2,860,973 | 11/1958 | Wells | 210—65 X |
| 2,866,827 | 12/1958 | Jurgeler et al. | 210—24 X |
| 3,334,042 | 8/1967 | Teitsma | 210—40 X |
| 3,358,838 | 12/1967 | Kosar et al. | 210—242 X |
| 3,426,902 | 2/1969 | Kilpert et al. | 210—179 |

JOHN W. ADEE, Primary Examiner

U.S. Cl. X.R.

210—73, 242, 294